Figure 1:
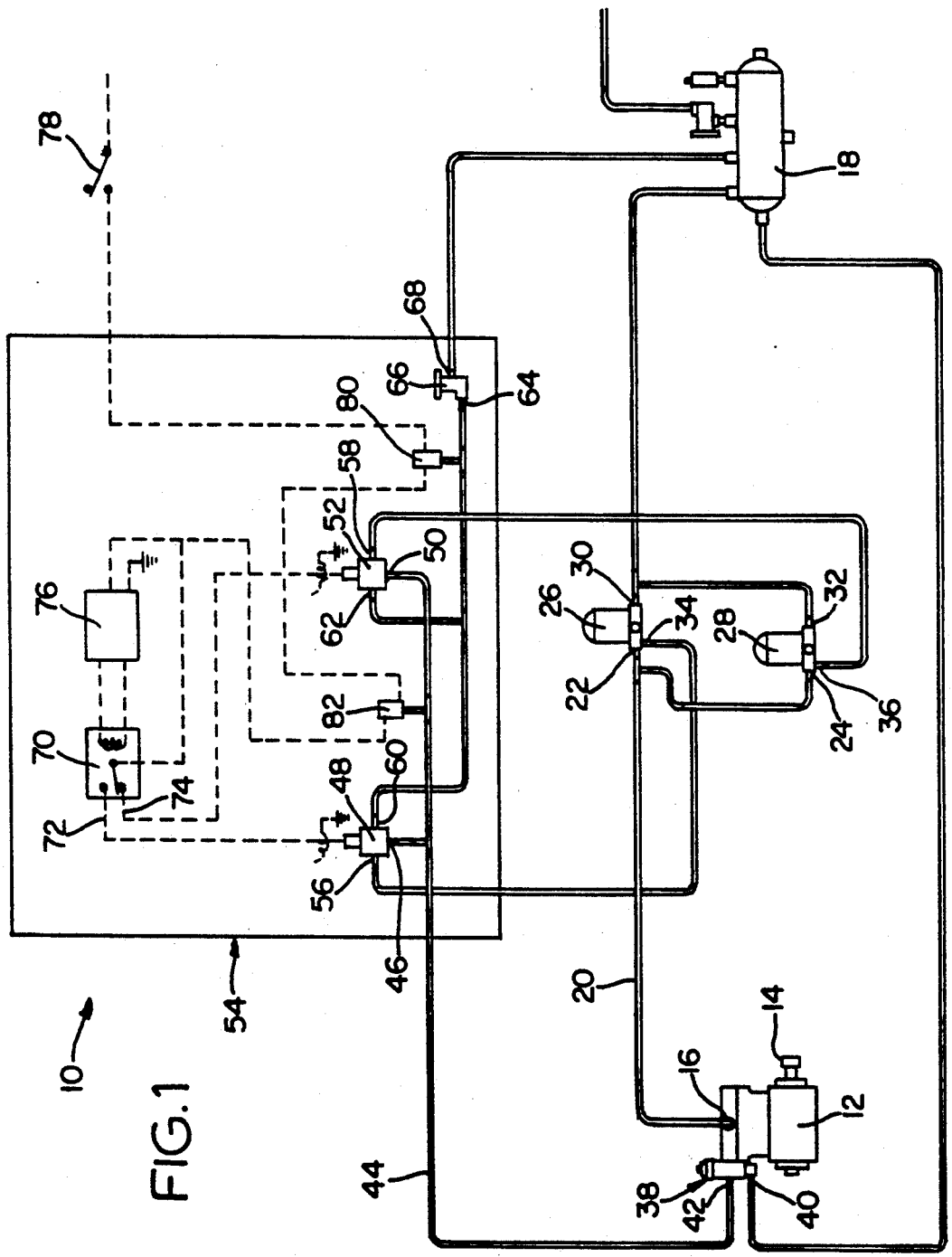

United States Patent [19]
Eberling

[11] Patent Number: 5,209,764
[45] Date of Patent: May 11, 1993

[54] COMPRESSED AIR SYSTEM WITH TWIN AIR DRYERS

[75] Inventor: Charles E. Eberling, Wellington, Ohio

[73] Assignee: Allied Signal Inc., Morristown, N.J.

[21] Appl. No.: 747,779

[22] Filed: Aug. 20, 1991

[51] Int. Cl.$^5$ ............................................. B01D 53/00
[52] U.S. Cl. ......................................... 55/162; 55/163; 55/180
[58] Field of Search .................... 55/162, 163, 180, 33, 55/387, 389

[56] References Cited

U.S. PATENT DOCUMENTS

| | | | |
|---|---|---|---|
| 3,902,875 | 9/1975 | Bridigum et al. | 55/162 |
| 3,923,479 | 12/1975 | Glass et al. | 55/163 |
| 4,468,239 | 8/1984 | Frantz | 55/162 |
| 4,487,617 | 12/1984 | Dienes et al. | 55/163 |
| 4,549,888 | 10/1985 | Fannin | 55/163 |
| 4,721,515 | 1/1988 | Hata et al. | 55/162 |
| 4,806,134 | 2/1989 | Lhota | 55/162 |
| 4,812,148 | 3/1989 | Hata et al. | 55/162 |

*Primary Examiner*—Bernard Nozick
*Attorney, Agent, or Firm*—Ken C. Decker; William N. Antonis

[57] ABSTRACT

An air dryer control system is disclosed in which the compressed air output of a compressor is dried by one of two air dryers connected in parallel. The purging and drying cycles of the air dryers are alternated by timing and relay device. Upon start-up, the output of the compressor is dried by both airdryers until the pressure level in the supply reservoir attains a predetermined level. When the governor cutout pressure is achieved in the reservoir, both air dryers are purged.

6 Claims, 2 Drawing Sheets

COMPRESSED AIR SYSTEM WITH TWIN AIR DRYERS

This invention relates to a compressed air system for automotive vehicles which includes a pair of air dryers for drying compressed air before it is communicated to a storage reservoir.

Modern heavy duty vehicles are equipped with compressed air systems to operate the brakes of the vehicle. On some vehicles, the compressed air system may also be used to operate accessories, such as bulk loaders and/or other devices. While normal compressed air braking systems require only a single air dryer which is purged when the vehicle air compressor is unloaded, vehicles which use compressed air to operate accessories with high air consumption rates require a continuous flow system. Continuous flow systems require a pair of air dryers operated in parallel, so that one of the air dryers is purged while the other air dryer is used to dry compressed air. Accordingly, prior art systems require a switching valve separate from the air dryers that alternates between the input or supply ports of the two air dryers. This switching valve must incorporate a heater similar to that contained within the air dryers to prevent freeze ups.

The present invention eliminates the heated three-way valve which was required in prior art systems, thereby resulting in a simpler and more reliable system that does not require a separate heated valve.

Figure 2:
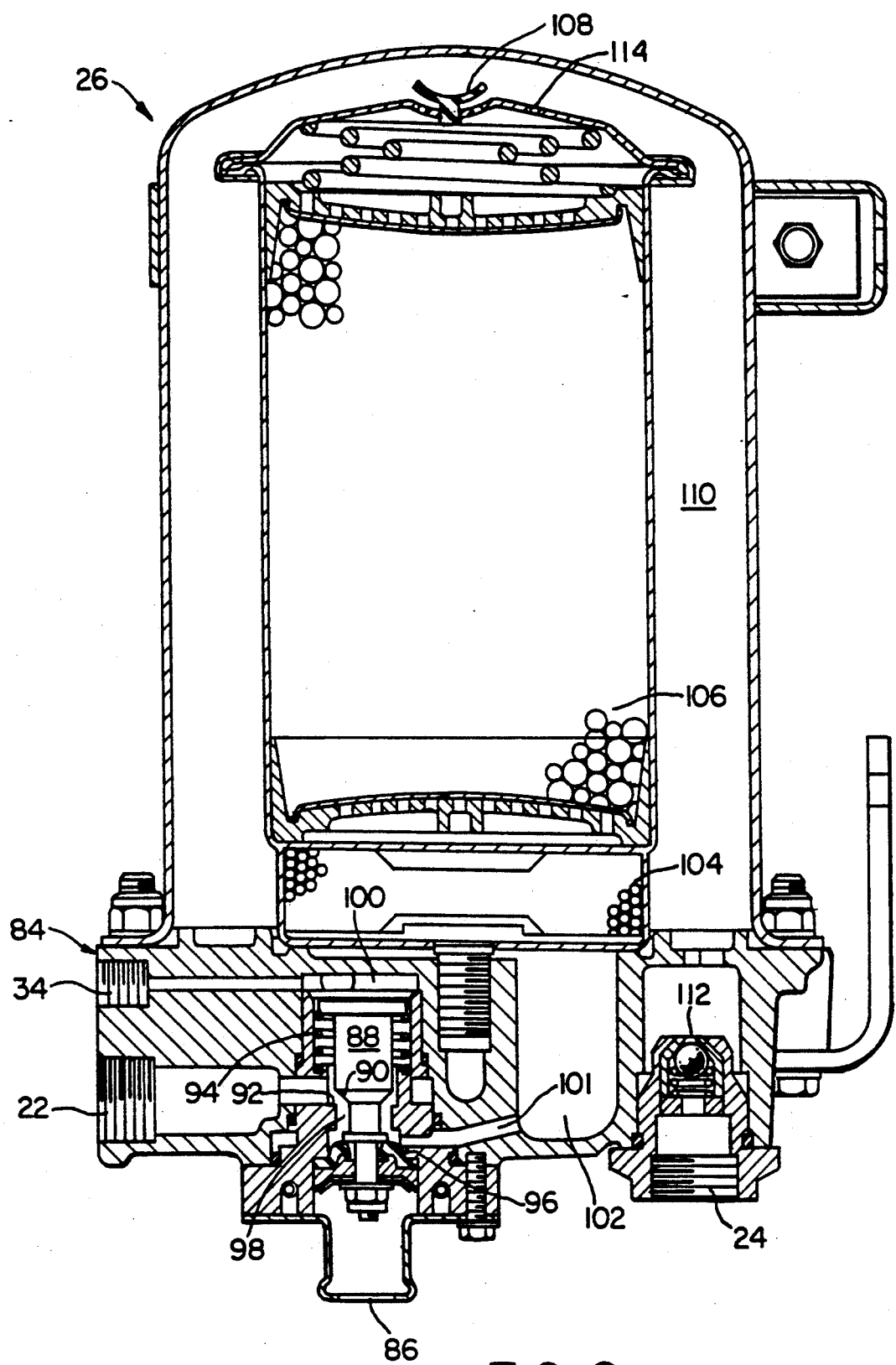

This and other advantages of the present invention will become apparent from the following description, with reference to the accompanying drawings, in which;

FIG. 1 is a schematic illustration of a compressed air system pursuant to the teachings of the present invention; and FIG. 2 is a cross-sectional view of the air dryers used in the system illustrated in FIG. 1.

Referring now to the drawings, a vehicle compressed air supply system generally indicated by the numeral 10 includes a conventional automotive air compressor 12 which is powered by the engine (not shown) of the vehicle upon which the system 10 is used. Air compressor 12 is a reciprocating type compressor which is operated by rotating air compressor crankshaft 14. The air compressor 12 is provided with an outlet or delivery port 16 which is connected to a conventional reservoir 18 by a delivery line 20. The delivery line 20 is connected to supply ports 22, 24 of conventional air dryers 26, 28 which are connected in parallel in the supply line 20. The delivery ports 30, 32 of the air dryers 26, 28 are connected to the reservoir 18. Air dryers 26, 28 further include control ports 34, 36, and are responsive to a pressure signal communicated to the corresponding control port 34 or 36 to initiate a purging or regeneration cycle as will hereinafter be described. Each of the air dryers 26, 28 are identical, and are of the type illustrated in FIG. 2 hereof.

The air compressor 12 is controlled by a conventional governor generally indicated by the numeral 38. The supply port 40 of governor 38 is connected to the reservoir 18. When the pressure level in reservoir 18 attains a predetermined level, the governor 38 opens to communicate a pressure signal which disables the air compressor 12. The air compressor 12 may be disabled, for example, by using the pressure signal transmitted by the governor 38 to hold open the valves of the compressor 12, or the pressure signal generated by governor 38 may be used to operate a pneumatically actuated clutch (not shown) which disconnects the crankshaft 14 from the vehicle engine.

The pressure signal generated by governor 38 when the pressure level in reservoir 18 attains a predetermined level is transmitted through delivery port 42 of governor 38 and outlet line 44 to the inlet port 46 of a solenoid actuated air control valve generally indicated by the numeral 48. Line 44 is also connected to inlet port 50 of another solenoid actuated valve 52, which is identical to the valve 48. The valves 48, 52 are part of a control module generally indicated by the numeral 54. The electrical lines within control module 54 are indicated by dashed lines, and the air lines within module 54 are indicated by solid lines. The valve 48 also includes a delivery port 56 which is connected to control port 34 of air dryer 26, and the valve 52 includes a delivery port 58 which is connected to control port 36 of air dryer 28.

Valves 48, 52 include respective supply ports 60, 62 which are connected to delivery port 64 of a conventional pressure protection valve 66. The supply port 68 of pressure protection valve 66 is connected to the air reservoir 18. The pressure protection valve 66 is conventional, and remains closed, cutting off communication therethrough, until the pressure level in supply reservoir 18 attains a predetermined level, whereupon the pressure protection valve 66 opens to communicate pressure from supply reservoir 18 to the ports 60, 62 of the valves 48, 52. Each of the valves 48, 52 are actuated by an electrical signal from a normal state in which the supply ports 60, 62 are closed and the delivery ports 58, 60 are communicated to the corresponding ports 46 or 50 which are connected to the delivery port 42 of governor 38.

The solenoid of the solenoid valves 48, 52 are operated by a single pole, double throw relay 70. The terminals 72, 74 of the relay 70 are connected respectfully to operate the valves 48, 52. The relay 70 is controlled by a conventional timer 76. Relay 70 responds to termination of each of the timing cycles of the timer 76 to switch power from the terminal 72 to terminal 74 or from the terminal 74 to the terminal 72, as the case may be. Power is supplied to the timer 76 and to the relay 70 from the vehicle power supply, which is controlled by the vehicle ignition switch 78. The ignition switch 78 is connected both to the timer 76 and to the relay 70 through both a normally open pressure switch 80, which is connected between the delivery port 64 of the pressure protection valve 66 and the supply ports, 60, 62 of the valves 48, 52, and through a normally closed low pressure switch 82. Switch 80 closes at about the same pressure that exists at the delivery port 64 of the pressure protection valve 66, and switch 82 is opened when the pressure level in line 44 attains a predetermined level. Switch 82 is normally closed to provide a connection between the switch 80 and the timer 76 and relay 70.

Referring now to FIG. 2, air dryer generally indicated by the numeral 26 will be described in detail, but, as discussed above, air dryer 28 is identical to the air dryer 26. Air dryer 26 includes a housing generally indicated by the numeral 84. The housing 84 carries the supply or inlet port 22, the delivery port 24, and the control port 34. An exhaust port 86 permits an exhaust to atmosphere as will hereinafter be defined. The supply port 22 communicates through a purge valve generally indicated by the numeral 88. Purge valve 88 carries a valve seating area 90 which is engagable with a corresponding valve seating area 92 on the housing 84. However, a spring 94 yieldably urges the valve seating area 90 away from the valve seating area 92. The purge valve 88 further carries an exhaust valve seat 96 that is biased into engagement with a corresponding seat on the housing when the piston is biased into the position shown. Accordingly, when the purge valve element 88 is in its normal upper position illustrated in the drawing, compressed air communicated through supply port 22 is permitted to flow through valve seating areas 90, 92 into an annular chamber 98, and the exhaust port 86 is cut off by sealing engagement of the exhaust valve seat 96 with the housing.

The purge valve 88 is responsive to a pressure signal communicated through control port 34 which is communicated into control volume 100 to overcome the force of spring 94 and drive the valve seating area 90 into sealing engagement with valve seat 92, thereby closing off the supply port 22, and simultaneously driving the valve seat 96 controlling flow through exhaust port 86 away from the housing. Air communicated through supply port 22 when the purge control valve 88 is in the position illustrated is communicated from chamber 98 through passages 100 and 102 and through a crushed aluminum oil separator 104 into a desiccant bed 106. Compressed air flows through desiccant bed 106, where moisture is removed from the compressed air, through check valve 108 into purge volume 110. Air from purge volume 110 is communicated through conventional check valve 112 to delivery or outlet port 24, and from there to reservoir 18 as described above. When a signal is transmitted to the control port and is admitted to control volume 100, the purge valve 88 is driven downwardly, viewing FIG. 2, thereby closing off supply port 22 and opening the passages 100, 102 to the exhaust port 86. Accordingly, compressed air stored in the desiccant bed 106 and in the purge volume 110 will be exhausted to atmosphere through exhaust port 86, thereby purging the desiccant bed 106. A flow restricting orifice 114 limits flow from purge volume 110 into the desiccant bed 106.

In operation, it is assumed that the supply reservoir 18 will be fully depleted when the vehicle engine is started. Accordingly, pressure protection valve 66 will be closed, and normally open pressure switch 80 will cut off power to the relay 70 and timer 76. Furthermore, the delivery line 44 from governor 38 will be vented. Since both of the solenoid controlled valves 48 and 52 will then be deenergized and the ports 46 and 50 vented, the control ports 34, 36 of both of the air dryers 26, 28 will also be vented, so that neither air dryer 26, 28 will initiate a purging cycle, and both of the air dryers 26, 28 will dry compressed air generated by the compressor 12, which is then communicated to the supply reservoir 18. At the predetermined pressure level, pressure protection valve 66 opens, thereby delivering pressure from reservoir 18 to supply ports 60, 62 of the valves 48, 52. At the same time, pressure switch 80 permits electrical energy to be transmitted to the timer 76 and relay 70. Since the governor 38 is far below the cutout pressure, line 44 remains vented, so that the switch 82 remains closed.

When power is transmitted to the timer 76 and relay 70, the armature of the relay is moved back and forth between the terminals 72 and 74 at the completion of each timing cycle. Assuming that the armature of the relay 70 is in contact with the terminal 74 when the pressure protection valve 66 opens, valve 52 will be energized, thereby supplying a pressure signal to control port 36 of air dryer 28. Accordingly, air dryer 28 will begin a purge cycle, in which the desiccant bed thereof is opened to atmosphere to permit purging of the desiccant, and the supply port 24 is closed. However, air continues to flow through supply port 22 of the air dryer 26, where the air is treated by the desiccant in the normal manner to remove moisture therefrom. After the timer 76 times out, the armature of relay 70 is moved to the other terminal 72, thereby energizing the valve 48 and deenergizing the valve 52. Accordingly, the pressure signal to control port 36 is cut off, thereby closing the exhaust port of air dryer 28 and opening the supply port 24 thereof, so that the compressed air generated by air compressor 12 is then dried in the normal manner by the air dryer 28. At the same time a pressure signal is communicated to control port 34 of the air dryer 26, causing the latter to initiate a purging cycle in which the supply port 22 is closed and the exhaust port is opened.

The dryers 26, 28 continue to alternate purging and drying cycles in this manner until the pressure level of supply reservoir 18 attains the cutout pressure set by the governor 38. At this time, the governor 38 generates a pressure signal causing disabling of the air compressor 12, and also causing a pressure signal to be communicated through conduit 44. Switch 82 responds to the pressure level in conduit 44 to cut off power to the timer 76 and the relay 70. Accordingly, both of the valves 48 and 52 will be deenergized. However, as discussed above, when valve 52 is deenergized, the port 50 of valve 52 is communicated to the delivery port 58 thereof. When valve 48 is deenergized, the port 46 of valve 48 is connected to the delivery port 56 thereof. Since a pressure signal is now present in conduit 44, pressure signals are simultaneously delivered to the delivery ports 56, 58 of the valves 48, 52. Therefore, pressure signals are delivered simultaneous to the control ports 34, 36 of the air dryers 26, 28. Accordingly, a purge cycle is initiated in both air dryers 26, 28 when the governor 38 disables the air compressor 12.

When the pressure in supply reservoir 18 drops below the cut in pressure of the governor 38, the governor 38 again enables the compressor 12, and vents the conduit 44. The timer 76 and relay 70 then again begin alternating purging and drying cycles between the air dryers 26, 28 as described above. Since the cut in pressure of the governor 38 is well above the pressure at which the valve 66 closed, switch 80 remains closed so that electrical energy is immediately available to the relay 70 and timer 76 when the compressor is again enabled.

I claim:

1. Compressed air system comprising an air compressor for compressing air, a reservoir for storing compressed air, a governor responsive to the pressure level in the reservoir for enabling and disabling said air compressor to maintain the pressure level in the reservoir within a predetermined limit, and a pair of air dryers connected in parallel between the air compressor and the reservoir for removing moisture entrained in the air, control means for initiating an air drying cycle in one of said air dryers and a purging cycle in the other air dryer and switching the drying and purging cycles between said air dryers periodically until said air compressor is disabled by said governor, said control means including means responsive to disabling of said air compressor for simultaneously purging both of said air dryers after said air compressor is disabled by said governor, said control means includes a pair of electrically actuated valve means, each of said electrically actuated valve means being connected to a corresponding air dryer for communicating a dryer purge control pressure signal to the latter when an electrical signal is transmitted to the corresponding electrically actuated valve means, said corresponding air dryer including means responsive to said dryer purge control pressure signal for causing purging of said corresponding air dryer, and a timer for switching said control signal between said electrically actuated valve means on a regular periodic timed basis.

2. Compressed air system as claimed in claim 1, wherein said control means includes means responsive to disabling of said compressor for disabling said control means.

3. Compressed air system as claimed in claim 1, wherein said governor generates a compressor control pressure signal disabling said air compressor when the pressure level in the reservoir attains a predetermined level, said control means including a pressure switch responsive to the compressor control pressure signal from the governor for disabling said control means.

4. Compressed air system as claimed in claim 3, wherein each of the electrically actuated valve means include a first port communicated to said reservoir when the control means is enabled, a second port communicating said dryer purge control pressure signal to the corresponding air dryer, and a third port connected to said governor for receiving said compressor control pressure signal when the governor disables said air compressor, each of said electrically actuated valve means responding to said control signal to shift from a normal state connecting said third port with the second port to an actuated state connecting said first port to said second port and closing off said third port.

5. Compressed air system as claimed in claim 4, wherein said control means includes disabling means responsive to the pressure level in the reservoir for disabling said control means as long as the pressure level in the reservoir is below a predetermined level and enabling said control means when the pressure level in the reservoir is above said predetermined level, whereby communication of said dryer purge control pressure signal to either of said air dryers is inhibited as long as the pressure level in the reservoir is below the predetermined level.

6. Compressed air system comprising an air compressor for compressing air, a reservoir for storing compressed air, a governor responsive to the pressure level in the reservoir for enabling and disabling said air compressor to maintain the pressure level in the reservoir within a predetermined limit, and a pair of air dryers connected in parallel between the air compressor and the reservoir for removing moisture entrained in the air, control means for initiating an air drying cycle in one of said air dryers and a purging cycle in the other air dryer and switching the drying and purging cycles between said air dryers periodically until said air compressor is disabled by said governor, each of said air dryers including a supply port connected to said air compressor, a delivery port connected to said reservoir, and a control port responsive to a pressure control signal for simultaneously closing off said supply port and opening an exhaust port to permit purge air to exhaust through said exhaust port during said purge cycle to purge the corresponding air dryer, said control means including means for communicating a dryer purge control pressure signal to the control port of a corresponding air dryer when a purge cycle is to be initiated in said corresponding air dryer, said control means further including disabling means responsive to the pressure level in the reservoir for disabling said control means as long as the pressure level in the reservoir is below a predetermined level and enabling said control means when the pressure level in the reservoir is above said predetermined level, whereby communication of said dryer purge control pressure signal to either of said air dryers is inhibited as long as the pressure level in the reservoir is below the predetermined level, said control means including a pair of electrically actuated valve means, each of said electrically actuated valve means being connected to the control port of a corresponding air dryer, said corresponding air dryer including means responsive to the pressure level at its control port for causing purging of said corresponding air dryer, and a timer for switching said control signal between said electrically actuated valve means on a regular periodic timed basis.

* * * * *